(12) United States Patent
Harthill et al.

(10) Patent No.: US 6,896,813 B1
(45) Date of Patent: May 24, 2005

(54) SORBANT SEQUESTRATION AND REMOVAL OF TOXIC METAL IONS

(75) Inventors: Michalann Kunic Harthill, Frederick, MD (US); Nancy Shoemaker Simon, Oakton, VA (US)

(73) Assignee: The United States of America as represented by the Secretary of the Department of the Interior, Washington, DC (US)

( * ) Notice: Subject to any disclaimer, the term of this patent is extended or adjusted under 35 U.S.C. 154(b) by 113 days.

(21) Appl. No.: 10/402,224

(22) Filed: Mar. 31, 2003

(51) Int. Cl.⁷ ................................................. C02F 1/28
(52) U.S. Cl. ...................... 210/660; 210/661; 210/670; 210/679; 210/683; 210/688
(58) Field of Search ................. 210/660, 661, 210/670, 679, 683, 688

(56) References Cited

U.S. PATENT DOCUMENTS

| | | | |
|---|---|---|---|
| 2,292,632 A | 8/1942 | Greger | 210/205 |
| 2,324,079 A | 7/1943 | Greger | 210/205 |
| 4,668,658 A | 5/1987 | Jennings | 502/336 |
| 5,075,010 A | 12/1991 | Zhang | 210/638 |
| 5,126,048 A | 6/1992 | Zhang | 210/511 |
| 5,227,053 A | 7/1993 | Brym | 210/143 |
| 5,252,003 A | 10/1993 | McGahan | 405/128 |
| 5,769,961 A | 6/1998 | Peters et al. | 134/25.1 |
| 6,220,453 B1 * | 4/2001 | Kitajima et al. | 210/406 |
| 6,468,942 B1 | 10/2002 | Sansalone | 502/402 |
| 2002/0077249 A1 | 6/2002 | Schlegel et al. | 502/328 |
| 2003/0089665 A1 * | 5/2003 | Shaniuk | 210/668 |

* cited by examiner

*Primary Examiner*—Chester T. Barry
(74) *Attorney, Agent, or Firm*—Mark Homer

(57) ABSTRACT

A matrix for water decontamination has an amended sorbant cellulose substrate with an iron (ferric) oxyhydroxide component and a component to sorb dissolved organic compounds retained by the cellulose substrate.

19 Claims, No Drawings

SORBANT SEQUESTRATION AND REMOVAL OF TOXIC METAL IONS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

1. Field of the Invention

The present invention provides a water decontamination matrix having an amended sorbant cellulose substrate with an iron (ferric) oxyhydroxide component and a component to sorb dissolved organic compounds retained by the amended cellulose substrate.

2. Brief Description of the Related Art

The Environmental Protection Agency of the United States (USEPA) has recommended acceptable maximum contaminant levels of arsenic in drinking water to be ten parts per billion (10 ppb) or less, regardless of the arsenic speciation form.

United States Patent Application No. 2002/0077279A1 to Schlegel et al. discloses the use of pellets having iron oxide and/or iron oxyhydroxides solidified with oxides and/or (oxy)hydroxides of aluminum, magnesium or titanium. The solid pellet form of the composition of Schlegel et al. requires large amounts of external energy for facile development, is dense and thus easily saturated, can be subject to abrasion and subsequent loss of contaminant, and is generally not useful for individual use.

There is a need in the art to provide improved, easy to manufacture, inexpensive, easy to use, and effective water decontamination devices. The present invention addresses this and other needs.

SUMMARY OF THE INVENTION

The present invention includes a matrix for water decontamination comprising a sorbant cellulose substrate and an iron (ferric) oxyhydroxide component retained by the cellulose substrate in combination with a capturing component retained by the matrix with the amended cellulose substrate capable of effectively removing inorganic and organic arsenic species from a water sample. The capturing component may include an aluminum component such as aluminum oxyhydroxide or a dissolved organic compound sorbant.

The present invention also includes a process for producing decontaminated water by filtering a water sample through the amended cellulose substrate, and further includes a decontaminated water product resulting from the filtration of a water sample through the matrix. As used herein, the term "water sample" includes a limited quantity or amount of water for process by the matrix of the present invention. The present invention is applicable for municipal or domestic use for providing decontaminated water, such as for drinking, cooking, bathing, or washing, particularly where standard water treatment facilities are not available.

Additionally, the present invention includes a recycled spent matrix product.

Furthermore, the present invention includes a kit comprising the matrix and supporting infrastructure, particularly for individual or municipal use.

As used herein, the term "amended" with regard to cellulose pulp, membrane, plug, cartridge, pad, or other matrix structures includes the fresh addition of ferric oxyhydroxide and capturing component specifically for dissolved organic compounds attached thereto.

DETAILED DESCRIPTION OF THE PREFERRED EMBODIMENT

The present invention provides a matrix for water decontamination. The matrix includes an amended sorbant cellulose substrate having, preferably freshly prepared, an iron (ferric, i.e., (FeIII)) oxyhydroxide component and a capturing component such as a dissolved organic compound sorbant component or aluminum oxyhydroxide component, retained by the cellulose substrate. Cellulose pulp is used for the matrix substrate to maximize surface area for contact with amendments and with contaminants, especially toxic metals. A freshly prepared amorphous ferric (FeIII) oxyhydroxide, in its colloidal form and prior to any desiccation, provides the iron oxyhydroxide with a surface area upwards of 1000 times the surface area of the smallest granules. This large colloidal surface area means that the active sorption process and capacity is 1000 times more effective than that of pellets or granules of iron oxyhydroxide. Amorphous iron oxyhydroxide has a larger sorption capacity per unit weight than any other form of iron oxyhydroxide because its effective pH range is larger than any other form of iron oxyhydroxide: the effective pH range of amorphous (colloidal) iron oxyhydroxide extends to about pH 8.4. In contrast, other forms of iron oxyhydroxide, e.g., solid forms, lose their effectiveness as a sorbants for metal oxyanions at a pH of 7.8, thus not encompassing the full range of pH values for natural waters, particularly with regard to domestic use ranges of 5.5 to 8.5. Preferably, the present invention is prepared from ferric (FeIII) iron salts rather than ferrous (FeII) iron salts because the surface area and effective sorption capacity of colloidal ferric oxyhydroxides exceeds the surface area and effective sorption capacity of colloid ferrous oxyhydroxides by a factor of at least two. The matrix provides an effective means for decontaminating water, particularly from the presence of arsenic regardless of form. The matrices for colloidal iron oxyhydroxides provided for herein are benign, i.e., they pose no health or other types of hazards, and will not add any chemical or microbial contaminants or particulates to the resultant product water.

The sorbing cellulose substrate configuration of the matrix includes a sheet, membrane, plug, cartridge, pad, and/or other suitable configuration, as determinable by one skilled in the art in light of the disclosure herein, of a cellulose material appropriate for retaining the iron oxyhydroxide and capturing component, as appropriate for the water decontamination need. Preferably the cellulose substrate comprises cotton fibers, cellulose pulp, lignin and/or combinations thereof, with selection of the composition of the cellulose substrate determinable by one skilled in the art accounting for wear characteristics, method and period of use, and other such factors. The sorbing cellulose substrate may comprise any appropriate form, such as a singular or multi-layered structure, optionally having reinforcing sorbant members therein. Size and configuration of the substrate preferably varies with its intended use, such as for example without limitation, sheet or membrane dimensions of from about six square inches to about twelve square inches for filtering decanted natural water into the opening, aperature, or other appropriate entry of a holding vessel for potable water, plug to contiguously fit the bottom of a B üchner or Büchner-type funnel, plug to fit the stem of a Büchner or Büchner-type funnel, cartridge to fit a well-stem, and thick pad about five square feet to about ten square feet by several inches for sorbing contaminates from a municipal water reservoir.

In one preferred embodiment, the matrix may be configured to include amended cellulose pulp fiber confined between two amended membranes (i. e., membranes of cellulose substrate with retained iron oxyhydroxide and capturing component) to form a permeable plug fitting contiguously at the bottom of a funnel device, such as a Büchner type funnel, though which natural water is filtered into a holding vessel for potable water. Alternatively, the sorbing matrix may include amended cellulose pulp fiber confined within an amended membrane cylinder configured to fit within the stem of a funnel through which natural water is filtered into a holding vessel for potable water. In an additional preferred embodiment, amended cellulose pulp fiber confined between amended membranes to form a cartridge that is fitted into a well stem for preliminary water treatment at municipal water treatment plants, at domestic well sites, or at developing country well sites. Furthermore, a preferred embodiment may include amended cellulose pulp fiber confined between amended membranes to form a pad for secondary water treatment where the primary water treatment is decantation of naturally oxidized flocculated iron oxyhydroxides containing arsenic.

The iron oxyhydroxide component retained by the cellulose substrate comprises any appropriate concentrations of the iron oxyhydroxide for decontamination of water, particularly with regard to arsenic removal. Preferably, concentrations of the iron oxyhydroxide range from about 0.025 grams per gram of sorbant cellulose substrate to about 0.1 grams per gram of sorbant cellulose substrate are used, with more preferred concentrations of the iron oxyhydroxide ranging from about 0.05 grams per gram of sorbant cellulose substrate to about 0.075 grams per gram of sorbant cellulose substrate.

The capturing component may include an appropriate aluminum component or dissolved organic compound sorbant generally understood to sorb naturally occurring dissolved organic matter therein, such as dissolved organic compounds (referred to herein as "DOC") particularly those containing toxic metal components such as arsenic. Capturing components, or compositions therefrom, at times commercially referred to as dye trapping or dye sorbing compositions possess an attraction for the DOC matter, including DOC matter attached to arsenic compounds, i.e., the DOC-arsenic. Representative capturing compositions include for example ρ-arsanilic acid or arsenazo III (gentian violet). Combinations of the aluminum component and DOC capturing compositions may be used. Preferably the dissolved organic compound sorbant comprises an aluminum component, which is more preferably aluminum oxyhydroxide (AlOOH). The aluminum component, particularly when aluminum oxyhydroxide is used, is preferably present in concentrations of the aluminum component ranging from about 0.025 grams per gram of sorbant cellulose substrate to about 0.1 grams per gram of sorbant cellulose substrate, with more preferred concentrations of the aluminum component ranging from about 0.05 grams per gram of sorbant cellulose substrate to about 0.075 grams per gram of sorbant cellulose substrate.

The ratio of iron oxyhydroxide to aluminum component within the matrix may vary as appropriate to address specific impurities within a given water source, with ratios of iron oxyhydroxide to aluminum component preferably ranging for example without limitation from about 100:1 to about 1:100, about 50:1 to about 1:50, about 10:1 to about 1:10, about 1:1, or other variable ratios of these ranges used as determinable by one skilled in the art in light of the disclosure herein. Preferably, a concentration ratio of about 1:1 (iron oxyhydroxide: aluminum component) is present within the matrix. Loading of the iron oxyhydroxide for sheets includes preferred amounts of from about 0.005 $g/cm^2$ to about 0.1 $g/cm^2$, more preferably from about 0.01 $g/cm^2$ to about 0.09 $g/cm^2$, and most preferably from about 0.02 $g/cm^2$ to about 0.04 $g/cm^2$. Loading of aluminum oxyhydroxide includes preferred amounts of from about 0.005 $g/cm^2$ to about 0.1 $g/cm^2$, more preferably from about 0.01 $g/cm^2$ to about 0.09 $g/cm^2$, and most preferably from about 0.02 $g/cm^2$ to about 0.04 $g/cm^2$.

The present invention includes complimentary additives for use with the amended cellulose substrate. Such complimentary additives may include oxyhydroxides of manganese, magnesium, calcium, and silicon, and combinations thereof, and other such components that increase the efficiency or usefulness of the matrix. These complimentary additives may be identified and selected through routine experimentation by one skilled in the art.

In operation, the previously described matrix produces decontaminated water by gravity-fed passing or filtering water, either as a flow, sample, or other means, therethrough. Preferably the matrix is fitted as a filter over the opening of a holding vessel into which natural water is poured through to provide potable water for drinking, washing, cooking, bathing and other such uses. Alternatively, the matrix may be agitated while placed in contact with a domestic water sample, or used in an intermediate prior application in a water decontamination scheme, such as in a municipal water holding reservoir, especially in developing countries.

Applications of the present invention provides potable water, drawn from natural waters, water collection sites, residual waters, etc. within a given area, from which arsenic has been removed as taught herein. The term natural waters, as used herein, include those waters from sources such as groundwaters, rivers, streams, lakes, wells, plumbing systems, and other such sources where the quality of the water, particularly with regard to arsenic contaminants, is unknown or known to be problematic. Forms of the matrix particularly useful in point-of-use applications include, for example without limitation, tube cartridge configurations for use at well-stems such as a straw-filter; membrane filters for domestic vessel water preparation in developing countries; water preparation augmentors, including pulp-filed straws, for personal or unit, e.g., military (canteens or containers) and incidental recreational use; medical water supplies in developing countries, and the like; sheet cloth for use for hospital unit spills, laboratory unit spills, and the like, etc., with minimal or no contaminant concerns generally resulting from use of the matrix as the cellulose substrate protects the retained iron oxyhydroxide and/or sorbant while in use. With limited movement of the matrix, as the cellulose substrate generally remains fixed during use, e.g., the matrix remains at a single confined location or position with the water gravity fed moving to and through it, the longevity of the matrix is increased significantly over that of indurated, nonporous matrices which may become quickly saturated and/or abraded. Additionally, the matrix remains efficient from a light weight construction, simplicity of both preparation and use, large surface area per volume, etc. Additionally, the present invention retains a high abrasion resistance, high hydraulic resistance, and high binding capacity for contaminants, but is preferably used absent of high hydraulic or other pressures, flow or shear turbulence, and the like to a degree that would detrimentally extract the iron oxyhydroxide or aluminum component from the cellulose substrate or interfere with the integrity of the cellulose substrate as understood by one skilled in the art in light of the disclosure herein. Although preferably utilized in point-of-use applications, the matrix may be used in large scale water treatment environments, such as water treatment plants and the like.

Combinations of the constructions for the matrix may be configured to meet specific conditions of natural water contamination to expedite and meet quality production levels of the resulting potable water, e.g., processing the matrix to address either natural waters with high concentrations of inorganic arsenic for heightened arsenic removal or high concentrations of dissolved organic compounds, especially with associated arsenic, for improved arsenic removal by heightened DOC removal. En addition to these material configurations being manufactured and layered to address removal of inorganic or organic contaminants found in specific natural waters, the configurations would be expected to trap microorganismic hazardous components of the natural waters, such as *Giardia* and *Cryptosporidium* infestations. Representative, and non-limiting, examples of use of the present invention include treatment of well water, especially after pretreatment by oxidized flocculation and decantation of supernatant from settled naturally occurring iron oxyhydroxide with associated metalloids (arsenic) and metal ions, treatment of a reservoir of tap water (e.g., domestic) for which additional water treatment is desired, treatment of surface water after filtration, eg., use of a mesh screen or sieve, to remove visible organic debris, and the like.

The present invention removes significant amounts of arsenic, in its several chemical forms, such as for example, inorganic arsenate (As(V)) and inorganic arsenite (As(III)), arsenic as part of the iron oxyhydroxide moiety (FeOOH—As), organic arsenic in both dissolved organic compounds (DOC-As) and suspended material (e.g., sediments, algal debris, drift), etc. Organic arsenic, especially as DOC-As, is particularly removed from the water by the amended cellulose substrate. Other removed contaminants include, for example without limitation, phosphorous compounds, oxyanions of metals and microorganisms including *Giardia, Cryptosporidium, Bacillus anthracis,* etc. The large surface area provided by the present invention allows an at-will process for use, e.g., use by individuals for given circumstances or occasions, allowing convenient use, e.g. gravity feed (vertical, directional flow filters, etc.), through-flow, and other such processes.

A decontaminated water results from the use of the matrix. Purity of the water is proportional to the previous use ofthe matrix, e.g., method of use, handling, age, etc., degree of contamination of the water to be purified, proper use of the matrix, chemical loading on the matrix, and other like factors. Preferably, the amount of arsenic within the resultant purified water ranges from about 50 ppb or less, more preferably from about 25 ppb or less, and most preferably from about 10 ppb or less. The matrix is conveniently used in isolated areas, particularly for use by soldiers on patrol, field workers, or by populations in affected developing countries. Use includes sorbant removal of arsenic from municipal and domestic water sources in developing countries; fully prepared, i.e., chemically amended and packaged, portable personal water treatment for military personnel, journalists, or health providers in the field, or travelers; on-site treatment for special needs at hospital units, especially in developing countries; chemical and biological research laboratory clean-up of chemical spills; domestic well-water filters for treatment of water from high iron (or manganese or aluminum) aquifers, or those domestic aquifers high in specific anions such as arsenic; fully prepared, portable water treatment for recreational outings away from adequately treated water; fully prepared, portable emergency household or personal use; and the like. Use of the present invention may decrease concentrations of arsenic as inorganic As, FeOOH—As, and DOC-As to minimal levels, e.g., non-etectable by current means, thus meeting United States EPA and WHO water quality standards of 10 ppb or less. The product of the present invention produces water decontaminated below US EPA standards for arsenic in drinking water which includes (1) effective removal of arsenite and arsenate in the concentration range found in natural waters, and (2) the resulting concentration in the water treated by the present invention empirically demonstrated to be below the limit for arsenic set by the US EPA.

Manufacture of the matrix may be readily accomplished, as the cellulose substrate provides a facilely suitable platform for staging the iron oxyhydroxidc and capture components, as well as providing a platform on which these components readily interact with water contaminants for their removal from the water. The untreated cellulose, e.g., cotton and/or wood pulp product, is mixed with or treated with an iron composition to form iron oxyhydroxide, a sorbant such as aluminum composition to form aluminum oxyhydroxide, and optional adherents, processed into an appropriate form and fit into a carrier. Iron compositions used in the preparation of the matrix include soaking the cellulose substrate in iron chloride ($FeCl_3$) solution, iron sulfate ($Fe_2(SO_4)_3$), or other appropriate iron salt, with $FeCl_3$ preferred, and then air drying preferably with dehydration by evaporation. After the initial $FeCl_3$ preparation, the matrix is readily modified for use in field, such that, as sodium bicarbonte ($NaHCO_3$) is filtered through the matrix, the fiber swelling of the cellulose substrate maximizes the subsequent retention time and exposure of the iron oxyhydroxide and aluminum to the impurities of the water, increasing the removal of arsenic and other contaminants. The present invention uses amorphous forms of iron oxyhydroxide, and aluminum oxyhydroxide when used, with large, hydrated surface areas, ie., freshly wet at point of use, to optimize collection and retention of inorganic arsenic and DOC-arsenic by the matrix. Mechanical requirements of manufacture may include simplified methods such as solar drying by evaporation. The treated cellulose matrix is collected into an appropriate form, such as containerized pulp or pressed into membranes, for ease of use. Once manufactured, the matrix is transported to a given point of use site or processing area for further construction and/or packaging. In use, the matrix may then be wetted and treated with sodium bicarbonate ($NaHCO_3$) for converting the iron, and aluminum when present, to an oxyhydroxide form. After drying, the matrix is preferably flushed twice with water, such as twice, three times, etc., at a processing center or on site, thus retaining the colloidal properties of oxyhydroxide, and configured and installed for use as needed. In its most preferred form, the matrix includes a membrane having a strong fiber filter amended with solution(s) of ferric and aluminum salts, i.e., prepared with the salts sorbed to the membrane, and saturated with $NaHCO_3$ solution to convert iron to Fe(III) oxyhydroxides and aluminum to Al(III) oxyhydroxides. The membrane is flushed to remove excess $NaHCO_3$, formed into an appropriate configuration for use, and packaged air-tight for transport and use at a given time and place.

Once used, the matrix is preferably recycled. When containing arsenic, the matrix preferably may be recycled into insect, rodent and/or fungal repellent uses, if kept dry. Recycling of the matrix encourages total replacement of matrix due to the inexpensive materials and components of the matrix, with the dry matrix retaining the contaminants and limiting bacterial contamination in produced water. Preferably, spent matrices are used in a manner that prohibits release of the arsenic therefrom, such as cellulose filler/stabilizer in the manufacture of adobe bricks, for construction purposes. The flocculant sludge residual from the decantation process could be incorporated into adobe mixture.

Because the present invention is preferably designed for use in isolated areas, one preferred embodiment of the matrix includes a kit for containing and using the matrix. As such, proper and detailed instructions and warnings may be available with the matrix. Additionally, the matrix may be contained within a protective covering, such as for example without limitation, sealed plastic wrappings, metal or plastic box structures, etc. Kits may include, for example without limitation, composition tubes for use at municipal or domestic well stems, amended cellulose pulp with membranes and/or funnel components, and other like supporting infrastructure for domestic or personal use, composition cloth for clean-up of surface spills, and other such structures. Kits that comprise portable packets of prepared fiber membranes or pulp-filled straws (ca. dozen) may be carried by military personnel, journalists, health providers in the field, or travelers for personal use to make natural water potable, or be available for domestic use by civilians and others, such as for household, hospital, recreational, etc. use for potable water. These portable fiber membranes also may be used for chemical or biological laboratory wipe-up of spills.

EXAMPLES 1A–1D

Preparation of sorbant, cellulose fiber pulp matrix is exemplified in Examples 1A to 1D. Examples 1A, 1B and 1D exemplify constructive reduction to practice, with example 1C showing actual reduction to practice.

Example 1A: Cellulose fiber pulp is treated with a solution of ferric chloride and aluminum chloride salts having a concentration of 0.1 millimole of ferric and 0.1 millimole of aluminum ions per milliliter at a ratio of 10 mL of solution to 1 gram of cellulose fiber pulp.

Example 1B: Cellulose fiber pulp is treated with a solution of ferric sulfate and aluminum sulfate salts having a concentration of 0.1 millimole of ferric and 0.1 millimole of aluminum ions per milliliter at a ratio of 20 mL of solution to 1 gram of cellulose fiber pulp.

Example 1C: Cellulose fiber pulp was treated with a solution of ferric chloride and aluminum sulfate having a concentration of 0.05 millimole of ferric and 0.1 millimole of aluminum ions per milliliter at a ratio of 15 mL of solution to 1 gram of cellulose fiber pulp.

Example 1D: Cellulose fiber pulp is treated with a solution of ferric sulfate and aluminum chloride having a concentration of 0.15 millimole of ferric and 0.15 millimole of aluminum ions per milliliter at a ratio of 10 mL of solution to 1 gram of cellulose fiber pulp.

The treated cellulose fiber pulp is air dried. The air dried treated cellulose fiber pulp is transported to a distribution site near point of use. Either prior to transportation or at the point of use, the cellulose fiber pulp is wetted with water to form a slurry, sodium bicarbonate is added until neutralization, i.e., no fizzing ($CO_2$ gas release) appears in the slurry. Ferric ion and aluminum ions fixed to the cellulose fiber pulp convert, ie., iron and aluminum to Fe(III) and Al(III) (oxy)hydroxides, respectively. The slurry is flushed with water until the effluent is colorless, after which the water is drained (if the slurry is flushed with natural water, until effluent is the color of natural water and then drain).

The drained slurry, now a sorbant pulp matrix, is processed into a sheet (membrane), pulp, cartridge, or pad or other appropriate configuration for use to remove inorganic and/or organic arsenic species from water to be treated. Natural water is drawn from a source, e.g., tube well, and allowed to oxidize iron in the water, causing iron flocculation, with arsenic if present. After iron flocculation occurs, thus removing about 50% arsenic from water, cleared water is decanted allowing iron-arsenic flocculants to remain on vessel bottom for later disposal. Using amended pulp, as cartridge, filter membrane or pad, decanted water is filtered into container receiving water to be used for drinking, cooking, or bathing.

Water treatment performance of Example 1C was as follows: The sorption capacity for arsenic was 240 µg per gram of treated cellulose matrix, containing approximately 0.05 gram of iron oxyhydroxide per gram of matrix.

EXAMPLE 2

Preparation of sorbant, commercial dissolved organic compounds-sorbing (i.e., dye-trapping functionality) fiber matrix membrane follows:

A capturing composition of dissolved organic compounds-sorbing fiber matrix membrane (commercially available by S.C. Johnson & Son, Inc., under the trademark SHOUT® ColorCatcher™) in the amount of 30 grams was saturated with a concentrated $FeCl_3$ solution and air dried. The air dried matrix membrane was transported to distribution site near an anticipated point of use. The matrix membrane was wetted thoroughly with water, saturated with $NaHCO_3$ solution, to convert the attached iron to Fe(III) oxyhydroxides, and flushed twice with natural water and drained. Natural water drawn from a tube well is allowed to aerate and oxidate, allowing ambient naturally occurring Fe(III) oxyhydroxide flocculation to occur, converting soluble arsenic species to insoluble reaction products, settling and removing about 50% arsenic from the volume of water. The clear water is decanted, allowing iron oxyhydroxide flocculant to remain on vessel bottom for later disposal. Using the matrix membrane, as cartridge or filter pad, decanted water is filtered into a container receiving potable water to be used for drinking, cooking, or bathing.

Water treatment performance for Example 2 follows: The sorption efficiency for arsenite ($NaAsO_2$ in water) with 15 mL of 100 ppb arsenite solution was 98.5% arsenite removal, resulting in product water with an arsenite concentration of 1.3 ppb. The sorption efficiency for arsenite ($NaAsO_2$ in water) with 15 mL of 500 ppb was 97.5% arsenite removal, resulting in product water with an arsenite concentration of 13.3 ppb. The sorption efficiency for arsenate ($NaHAsO_4\text{-}7H_2O$ in water) with 15 mL of 100 ppb arsenate solution was 99.9% arsenate removal; arsenate in the product water was below the detection limit for ICP-MS (<0.1 ppb). The sorption efficiency for arsenate ($NaHAsO_4\text{-}7H_2O$ in water) with 15 mL of 500 ppb arsenate solution was 100.0% arsenate removal; arsenate in the product water was below the detection limit for ICP-MS (<0.1 ppb). The membrane contained approximately 0.05 gram of iron oxyhydroxide per gram of matrix and had a sorption capacity of 240 µg per gram of arsenic.

The foregoing summary, description, and examples of the present invention are not intended to be limiting, but are only exemplary of the inventive features which are defined in the claims.

What is claimed is:

1. A matrix for water decontamination, comprising:

a sorbant cellulose substrate, and, an amorphous iron oxyhydroxide component retained by the cellulose substrate effective for sorbing inorganic arsenic in combination with an amporphous capturing component retained by the cellulose substrate effective for sorbing dissolved organic compounds and associated arsenic species, wherein the matrix is effective for water decontamination.

2. The matrix of claim 1, wherein the sorbant cellulose substrate comprises a material selected from the group consisting of cotton fibers, cellulose pulp, lignin pulp and combinations thereof.

3. The matrix of claim 1, wherein the sorbant cellulose substrate comprises a chemically multi-layered structure.

4. The matrix of claim 1, wherein the iron oxyhydroxide comprises a concentration of from about 0.025 grams per gram of sorbant cellulose substrate to about 0.1 grams per gram of sorbant cellulose substrate.

5. The matrix of claim 4, wherein the iron oxyhydroxide comprises a concentration of from about 0.05 grams per gram of sorbant cellulose substrate to about 0.075 grams per gram of sorbant cellulose substrate.

6. The matrix of claim 1, wherein the capturing component comprises a sorbant component selected from the group consisting of aluminum, dissolved organic compound sorbant and combinations thereof.

7. The matrix of claim 6, wherein the dissolved organic compound sorbant comprises an aluminum component.

8. The matrix of claim 7, wherein the aluminum component comprises aluminum oxyhydroxide.

9. The matrix of claim 8, wherein the aluminum oxyhydroxide comprises a concentration of from about 0.025 grams per gram of sorbant cellulose substrate to about 0.1 grams per gram of sorbant cellulose substrate.

10. The matrix of claim 9, wherein the aluminum oxyhydroxide comprises a concentration of from about 0.05 grams per gram of sorbant cellulose substrate to about 0.075 grams per gram of sorbant cellulose substrate.

11. The matrix of claim 8, wherein the ratio of iron oxyhydroxide to aluminum component is present at from about 100:1 to about 1:100.

12. A process for producing decontaminated water, comprising the steps of:

providing a matrix for water decontamination having a sorbant cellulose substrate and an amorphous iron oxyhydroxide component retained by the cellulose substrate in combination with a dissolved organic compound sorbant retained by the cellulose substrate effective for water decontamination;

affixing the water decontamination composition into a funnel apparatus; and, filtering a water sample therethrough after the affixing step.

13. The process of claim 12, further comprising the step of:

recycling the matrix.

14. A decontaminated water product produced by the process of claim 12.

15. The decontaminated water product of claim 14, wherein the amount of residual toxic metals ranges from about 10 ppb or less.

16. The decontaminated water product of claim 15, wherein the amount of residual toxic metals ranges from about 1 ppb or less.

17. A recycled product produced by the process of claim 13.

18. The recycled product of claim 17, wherein the product comprises an arsenic component.

19. A kit comprising the matrix for water decontamination of claim 1.

* * * * *